Sept. 14, 1926.
F. M. KOZMINSKI
COMMODE SEAT GUARD
Filed August 19, 1925
1,599,475
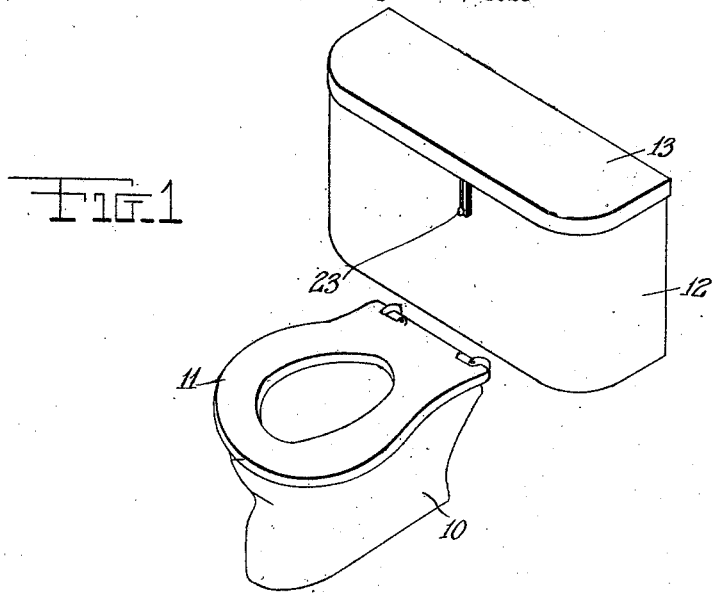
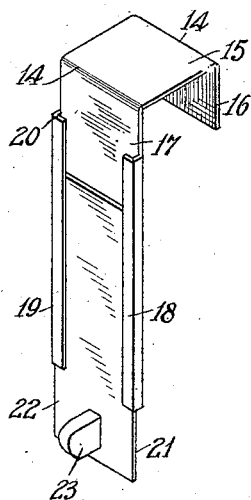
INVENTOR
*F.M.Kozminski*
BY *J. Ledermann*
ATTORNEY Patented Sept. 14, 1926.

1,599,475

UNITED STATES PATENT OFFICE.

FRANK M. KOZMINSKI, OF PORT RICHMOND, NEW YORK.

COMMODE-SEAT GUARD.

Application filed August 19, 1925. Serial No. 51,150.

The main object of this invention is to provide a commode seat cover guard whose purpose is to provide a device for preventing the noisesome lifting of the seat of the commode against the tank thereof. Ordinarily, this lifting causes the seat to strike against the wall of the flush tank noisily and also tends to chip the enamel, or cause other damage.

The above and other objects will become apparent in the description below, in which characters of reference refer to like-named parts in the drawing.

Referring briefly to the drawing, Figure 1 is a perspective view, showing the guard applied to a commode unit.

Figure 2 is a perspective view of one form of guard.

Referring in detail to the drawing, the numeral 10 indicates the body of the commode unit which has a hinged seat 11 thereon capable of being rotated from the horizontal position to the vertical. On a wall behind the body 10, a flush tank 12, closed by a cover 13, is mounted. On the upper edge of the flush tank beneath the cover 13 thereof, the guard is adapted to be mounted. One type of guard consists of a longitudinal member of material which is bent at two positions indicated by the numeral 14 to form a suspension hook 15 and a retainer ledge 16 for securely positioning the entire guard on the upper edge of the flush tank. From the hook, a longitudinal length of plate 17 extends downwardly and on its longitudinal edges, L-shaped elements 18 and 19 are formed. These elements face toward each other and create channels 20 in which the edges 21 of a longitudinal slidable plate 22 is slidable. This slidable plate is frictionally fitted into the guide channels and may be retained in any position along the length of these channels thru friction. At the lower end of the slidable plate a flexible bumper cushion 23, such as rubber or the like, projects. The bumper cushion 23 of the device is secured in place on members 21 in the following manner. This slidable plate 21 has an opening punched therein. The usual bumper cushion 23 is secured to the lower end of the slidable plate 21 and is adapted to contact with the commode seat 11 when the latter is raised to the vertical position.

The guard is suspended from its hook 15 and from the upper edge of the flush tank 12 immediately behind the body of the commode 10 and above the same. The commode seat 11 when lifted to the vertical position, usually sharply strikes the wall of the flush tank and commonly injures the finish of this wall by shattering the porcelain coating or otherwise scratching the same and also creates a noise unpleasant to hear. To eliminate these disagreeable features, the invention has been designed. When the commode seat 11 is lifted from the horizontal to the vertical position, the upper or forward edge of the seat strikes the bumper cushion 23, preventing further rotation of the seat and silencing the impact of contact of both members. For various sizes of seats, the front plate 17 of the guard is provided with means for permitting adjustment of the slidable plate 22 upon which the bumper cushion of the guard is mounted. In the device, illustrated in Figure 2, the sliding plate 22 is retained frictionally in position in the channels 20.

I claim:—

1. In combination with a commode unit having a hinged seat, a seat guard comprising a hook, a plate member integral with and suspended from said hook, a slidable plate slidably mounted on said plate, means for adjusting the position of said slidable plate, and a bumper projecting from the lower end of said slidable plate.

2. In combination with a commode unit having a hinged seat, a guard comprising a hook adapted to be suspended above the seat, a plate integral with said hook, guides on and integral with the longitudinal vertical edges of said plate forming channels, a slidable plate movable in said channels and frictionally retained in place therein, and a bumper cushion at the lower end of said slidable plate.

In testimony whereof I affix my signature.

FRANK M. KOZMINSKI.